(12) United States Patent
Truthseeker

(10) Patent No.: US 12,034,282 B2
(45) Date of Patent: Jul. 9, 2024

(54) INSERTION TOOL FOR USE WITH SOLAR CABLE MANAGEMENT CAVITY

(71) Applicant: Samuel Marcus-Flack Truthseeker, El Sobrante, CA (US)

(72) Inventor: Samuel Marcus-Flack Truthseeker, El Sobrante, CA (US)

(*) Notice: Subject to any disclaimer, the term of this patent is extended or adjusted under 35 U.S.C. 154(b) by 267 days.

(21) Appl. No.: 16/949,560

(22) Filed: Nov. 3, 2020

(65) Prior Publication Data

US 2021/0210936 A1    Jul. 8, 2021

Related U.S. Application Data

(60) Provisional application No. 62/957,927, filed on Jan. 7, 2020.

(51) Int. Cl.
| | |
|---|---|
| *H02G 1/08* | (2006.01) |
| *B25B 27/14* | (2006.01) |
| *H02S 30/10* | (2014.01) |
| *H02S 40/34* | (2014.01) |

(52) U.S. Cl.
CPC ............ *H02G 1/085* (2013.01); *B25B 27/14* (2013.01); *H02S 30/10* (2014.12); *H02S 40/34* (2014.12)

(58) Field of Classification Search
None
See application file for complete search history.

(56) References Cited

U.S. PATENT DOCUMENTS

| | | | |
|---|---|---|---|
| 5,265,326 A * | 11/1993 | Scribner | H02G 1/085 |
| | | | 81/488 |
| 6,111,189 A | 8/2000 | Garvison et al. | |
| 7,686,625 B1 | 3/2010 | Dyer et al. | |
| 8,806,814 B2 | 8/2014 | Tseng et al. | |
| 9,647,433 B2 | 5/2017 | Meine et al. | |
| 2004/0221524 A1 | 11/2004 | Poddany et al. | |
| 2008/0302407 A1* | 12/2008 | Kobayashi | F24S 25/632 |
| | | | 52/173.3 |
| 2012/0261526 A1 | 10/2012 | Rentfrow | |
| 2013/0284238 A1* | 10/2013 | Park | H02S 40/34 |
| | | | 136/251 |
| 2014/0109954 A1 | 4/2014 | Kanbara et al. | |
| 2014/0182662 A1 | 7/2014 | West et al. | |

(Continued)

FOREIGN PATENT DOCUMENTS

| | | |
|---|---|---|
| CN | 102473763 A | 5/2012 |
| CN | 10480008 A | 2/2015 |

(Continued)

*Primary Examiner* — Dustin Q Dam
(74) *Attorney, Agent, or Firm* — Armstrong Teasdale LLP

(57) ABSTRACT

An insertion tool for use with a cable management cavity includes a grip for a user to grasp the insertion tool. The grip has a longitudinal axis. The insertion tool also includes an insertion flange extending from the grip. The insertion flange includes a first end attached to the grip and a second end shaped to contact a cable. The insertion flange is sized to fit within the cable management cavity and insert the cable into the cable management cavity to a desired depth. The insertion flange has a length defined between the first end and the second end in a direction perpendicular to the longitudinal axis. The length is selected to allow the insertion flange to insert the cable into the cable management cavity to the desired depth.

19 Claims, 12 Drawing Sheets

(56) References Cited

U.S. PATENT DOCUMENTS

| | | | |
|---|---|---|---|
| 2014/0208585 A1* | 7/2014 | Betcher | H01R 43/22 29/748 |
| 2015/0075587 A1 | 3/2015 | Veloso et al. | |
| 2015/0144181 A1 | 5/2015 | Gilchrist et al. | |
| 2015/0188483 A1 | 7/2015 | Nishio | |
| 2016/0373053 A1* | 12/2016 | Grushkowitz | F16L 3/243 |

FOREIGN PATENT DOCUMENTS

| | | |
|---|---|---|
| CN | 104779901 A | 7/2015 |
| EP | 0977274 A2 | 2/2000 |
| JP | 2011035255 A | 2/2011 |
| WO | 2013180275 A1 | 12/2013 |

* cited by examiner

INSERTION TOOL FOR USE WITH SOLAR CABLE MANAGEMENT CAVITY

CROSS REFERENCE TO RELATED APPLICATION

This application claims priority to U.S. Provisional Application No. 62/957,927, filed Jan. 7, 2020, the disclosure of which is hereby incorporated by reference in its entirety.

FIELD

The field relates generally to insertion tools, and in particular, to tools for inserting a cable into a cable management cavity of a solar module.

BACKGROUND

An example of a solar module, for converting solar energy into useful forms of energy such as electricity, is a solar photovoltaic (PV) module. A PV module may include a series of PV cells in an assembly. Due to the fragility of the cells and the harsh environmental conditions they are often exposed to, the cells are often encapsulated in a rigid laminate. While PV laminates can be directly attached to a mounting structure, it is more common for them to be framed before mounting. PV module frames typically include aluminum extrusions having an upper cavity that receives the laminate when assembled. Frames for PV modules often include a mounting flange with pre-drilled holes for affixing the modules to mounting structures.

PV modules may also include various wiring, such as cables for connecting the PV module to other PV modules, or, in an AC PV module, AC cables for connecting to other AC PV modules. These cables and wires may need to be managed and retained within a footprint of the panel, according to various building codes and installation best practices.

Known methods for cable management include using zip ties and/or metal clips to secure cable to the module frame. Zip ties may wear out and subsequently fail over time, and more durable metal clips may be relatively expensive. Moreover, if an installer does not have sufficient zip ties and/or metal clips, the installer may need to leave the installation site to retrieve more cable management implements. An improved system for managing cables in the frame is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an insertion tool for use with a cable management cavity includes a grip for a user to grasp the insertion tool. The grip has a longitudinal axis. The insertion tool also includes an insertion flange extending from the grip. The insertion flange includes a first end attached to the grip and a second end shaped to contact a cable. The insertion flange is sized to fit within the cable management cavity and insert the cable into the cable management cavity to a desired depth. The insertion flange has a length defined between the first end and the second end in a direction perpendicular to the longitudinal axis. The length is selected to allow the insertion flange to insert the cable into the cable management cavity to the desired depth.

In another aspect, an insertion tool for inserting a cable into a cable management cavity defined by a flange of a PV module framing system or a PV module racking system includes a grip for a user to grasp the insertion tool and an insertion flange extending from the grip. The insertion flange includes a first end attached to the grip and a second end shaped to contact a cable. The insertion flange is sized to fit within the cable management cavity and insert the cable into the cable management cavity to a desired depth. The insertion tool also includes an alignment flange extending from the grip. The alignment flange and the insertion flange define a gap sized to receive the flange defining the cable management cavity. The alignment flange is shaped and sized to extend along the flange of the PV module and provide alignment of the insertion flange within the cable management cavity when the insertion tool is used to insert the cable into the cable management cavity. The insertion tool also includes a stop sized and shaped to contact the flange defining the cable management cavity and limit the depth that the cable is inserted into the cable management cavity using the insertion tool.

In yet another embodiment, a method of attaching a cable to a PV module framing system or a PV module racking system using an insertion tool includes positioning the cable adjacent a cable management cavity defined by a flange of the PV module framing system or the PV module racking system. The method also includes contacting the cable with an insertion flange of the insertion tool. The insertion tool includes the insertion flange and a grip. The grip has a longitudinal axis. The method further includes inserting the cable into the cable management cavity to a desired depth using the insertion tool. The insertion flange including a first end attached to the grip and a second end shaped to contact a cable. The insertion flange is sized to fit within the cable management cavity. The insertion flange has a length defined between the first end and the second end in a direction perpendicular to the longitudinal axis. The length is selected to allow the insertion flange to insert the cable into the cable management cavity to the desired depth.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 14:
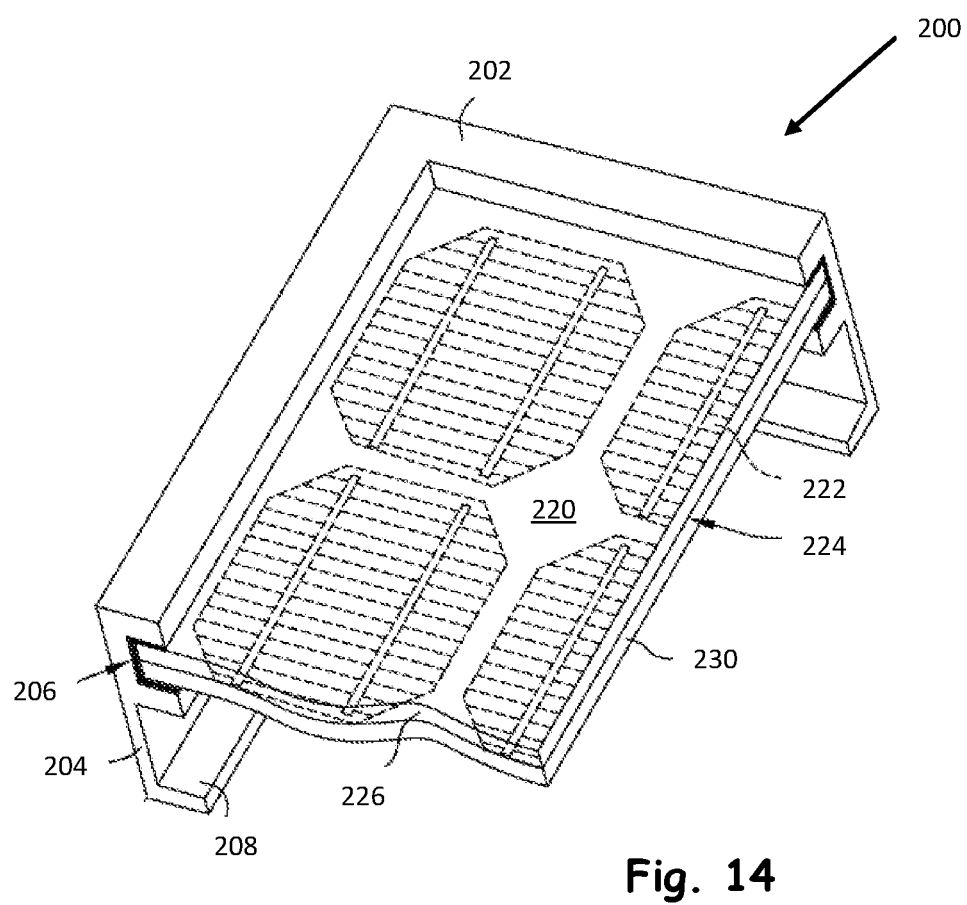
FIG. 14 is a perspective of an example prior art solar module.

FIG. 14 depicts an example known solar module 200. The module includes a frame 202 and a photovoltaic (PV) laminate 220. The laminate 220 includes a plurality of PV cells 222 encapsulated in an active layer 224 between a glass cover 226 and a back cover 230. The laminate 220 may further include wiring (not shown) connecting the PV cells 222 in a series and parallel configuration.

The frame 202 includes a frame body 204, an upper cavity 206 configured to receive and retain the laminate 220, and a mounting flange 208. The mounting flange 208 extends from a bottom of the frame body 204. The mounting flange 208 may include a plurality of holes (not shown) for receiving fasteners to secure the frame 202 to a mounting surface (not shown). The frame 202 may be made from aluminum or other suitable material(s). Additionally, the frame 202 may be made by an extrusion process. The frame 202 of the solar module 200 has several functions. Among the features are that the frame 202 provides edge protection for the laminate 220. More specifically, the frame 202 protects the edge of the laminate 220 from direct impact during shipping and/or installation, which protects the edge from cracking, and minimizes any water penetration into the laminate 220 (e.g., between the front and back covers 226, 230). Also, the frame 202 enhances the mechanical stiffness of the solar module 200, which limits laminate 220 flexing due to, for example, extreme winds and/or heavy snow loads, which may otherwise cause breakage of the solar module 200. Further, the frame 202 provides a mounting interface such that the module 200 may be mounted to a plurality of surfaces (e.g., a roof of a building, a ground structure, a pole, etc.).

The PV module frame 202 may also provide a cable management function such that the wires and cables that run to and from the laminate 220 may be housed along the body 204 of the frame 202. As described above, a frame should facilitate retention of wires and cables, including DC cables for connecting the laminate 220 to other PV modules, or, in an AC PV module, AC cables for connecting to other AC PV modules. The frame 202 shown in FIG. 14 may only facilitate such retention using additional cable management implements (not shown), such as zip ties and/or metal clips, which an installer may use to secure a length of cable to the mounting flange 208 and/or the body 204 of the frame 202. Alternative frames may include one or more flanges defining a cable management cavity (such as cable management flange 126 shown in FIGS. 3-6).

Figure 1:
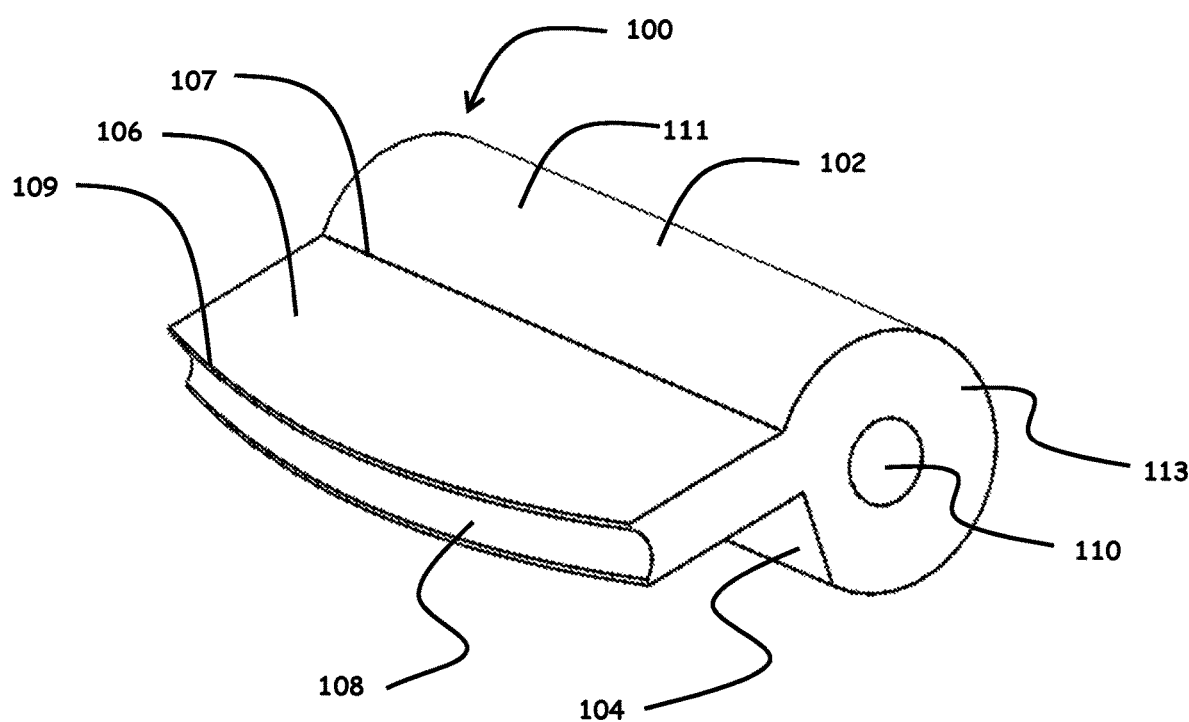
FIG. 1 is a perspective view of an example insertion tool including an insertion flange.

FIG. 1 is a perspective view of an example insertion tool 100 for inserting a cable 118 (shown in FIGS. 3-6) into a cable management cavity 122. The insertion tool 100 includes a grip 102 and an insertion flange 106. The grip 102 is shaped and sized to comfortably fit within a user's hand for a user to grasp the insertion tool 100. In the example, the grip 102 is a cylinder. In alternative embodiments, the grip 102 may have other shapes without departing from some aspects of the disclosure.

The insertion flange 106 extends from the grip 102 and is sized to fit within the cable management cavity. The insertion flange 106 includes a first end 107 attached to the grip 102 and a second end 109 shaped to contact a cable to insert the cable into the cable management cavity 122. In the example, the second end 109 of the insertion flange 106 is curved and includes a recess 108 configured to receive the cable 118. The recess 108 curves inward, i.e., is concave, between longitudinally extending edges of the insertion flange 106. For example, the recess 108 may be curved to match the radius of the cable 118. Accordingly, the second end 109 provides increased contact area between the insertion flange 106 and the cable 118. Moreover, the second end 109 reduces contact pressure on the cable 118 as the cable 118 is inserted into a cable management cavity 122.

The insertion flange 106 has a length from the second end 109 to the first end 107. The length is defined in a direction perpendicular to the longitudinal axis of the grip 102. The length is selected to allow the insertion flange 106 to insert the cable 118 into the cable management cavity 122 to a desired depth. The insertion flange 106 also has a thickness defined between opposed surfaces of the insertion flange 106. The thickness is less than a height of the cable management cavity 122 such that the insertion flange 106 fits within the cable management cavity 122. Moreover, the insertion flange 106 has a width defined between sides of the insertion flange 106. The width is greater than the thickness of the insertion flange 106 and is selected for the insertion flange 106 to contact a length of the cable 118 with a force sufficient to insert the cable 118 into the cable management cavity 122 without damaging the cable 118. In the example, the insertion flange 106 extends along the entirety of the grip 102 such that the sides of the insertion flange 106 are flush with the sides of the grip 102.

The insertion tool 100 also includes a stop 104 that limits the depth that the cable 118 is inserted into the cable management cavity 122 using the insertion tool 100. The stop 104 is located on the grip 102 next to the second end 109 of the insertion flange 106. Accordingly, the stop 104 contacts a flange defining the cable management cavity (such as the flange 124 and the cable management flange 126) when the insertion flange 106 is inserted into the cable management cavity 122 to a desired depth. In some embodiments, the stop 104 may contact any flange or part of the PV module that allows the stop 104 to limit the depth of insertion. For example, the stop 104 may contact the cable management flange 126, a mounting flange 124, a laminate flange, and/or any flange of the PV module. In the example, the stop 104 is a flat or planar surface. In other embodiments, the stop 104 may have other shapes without departing from some aspects of the disclosure.

The grip 102 includes a cylindrical body having an outer surface 111 and two side surfaces 113 defining openings 110 into a cavity. The outer surface 111 extends between the side surfaces 113 and parallel to a longitudinal axis of the body. The body is shaped for the user to grasp the outer surface 111. The cavity is defined by an inner surface of the cylindrical body and extends along the longitudinal axis of the body. The openings 110 and the cavity are sized and shaped to receive a rope or lanyard (not shown) for attaching the insertion tool 100 to a person or object. For example, an operator may wear the insertion tool 100 on a lanyard hung on their neck, shoulder, arm, waist, leg or other body part to store the insertion tool 100 when not in use.

The insertion tool 100 may be made from plastic, metal, or other suitable material(s). Additionally, the insertion tool 100 may be constructed as a single unitary piece. For example, the insertion tool 100 may be molded or 3-d printed from a plastic material as a single piece. In other embodiments, the insertion tool 100 is made of an extruded material that is machined to a desired shape. Accordingly, the insertion tool 100 may be more durable and simpler to manufacture than at least some other insertion tools.

Figure 2:
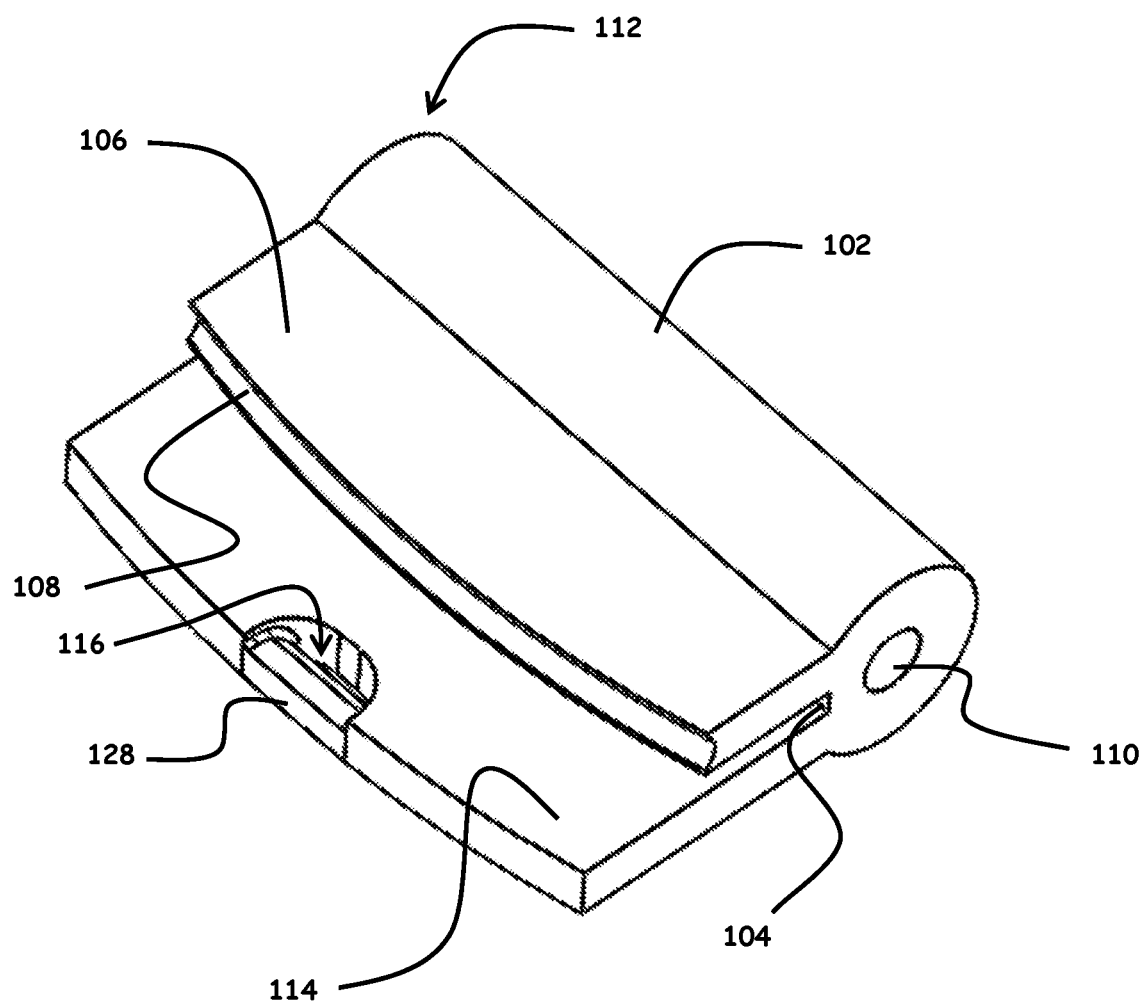
FIG. 2 is a perspective view of an example insertion tool including an insertion flange and an alignment flange.
Figure 3:
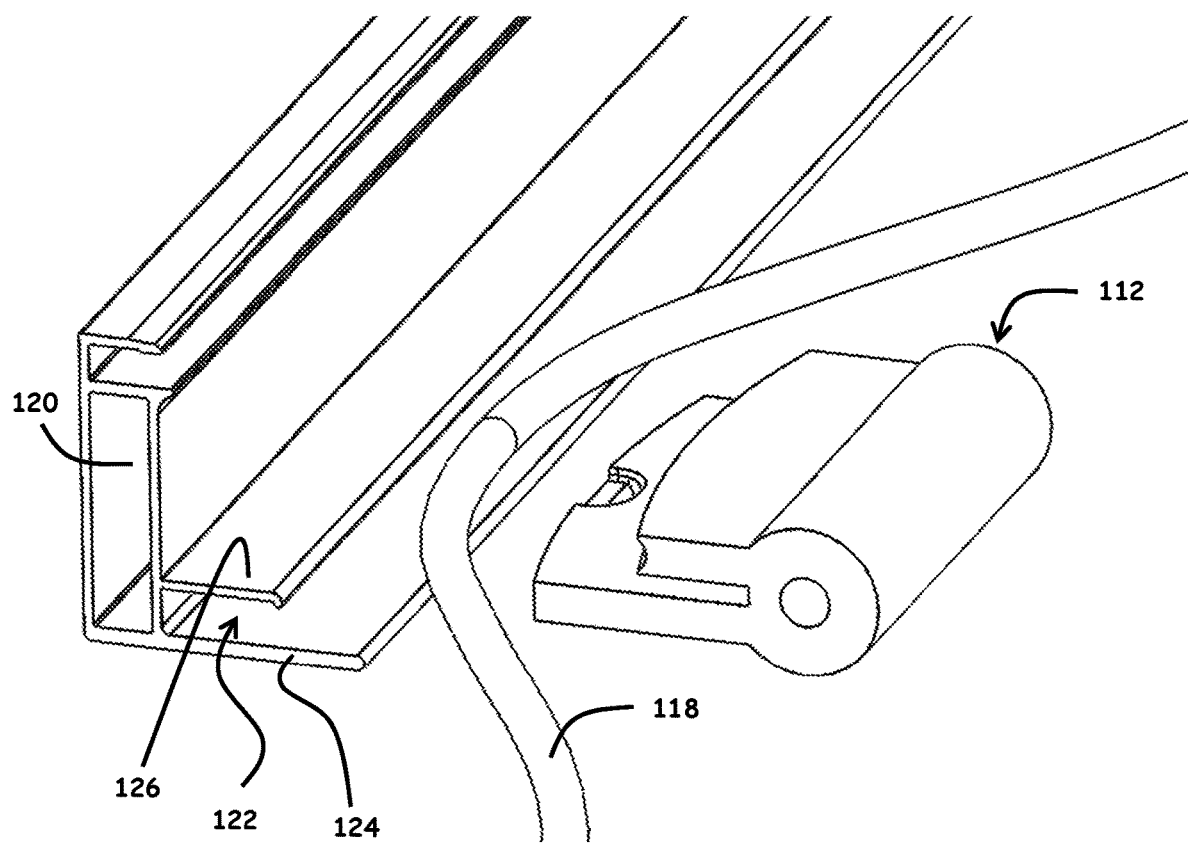
FIGS. 3-5 are perspective views showing a cable being inserted into a cable management cavity using the insertion tool shown in FIG. 2.
Figure 4:
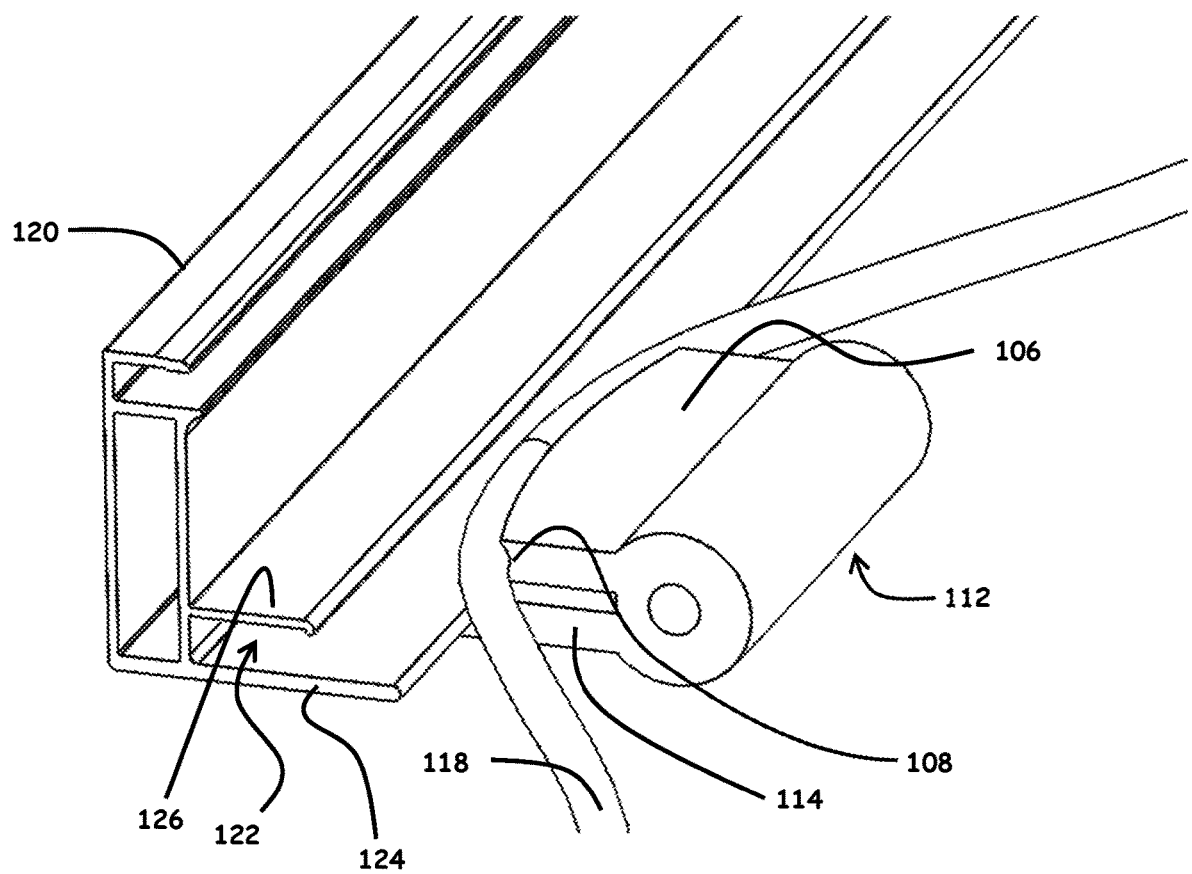
Figure 5:
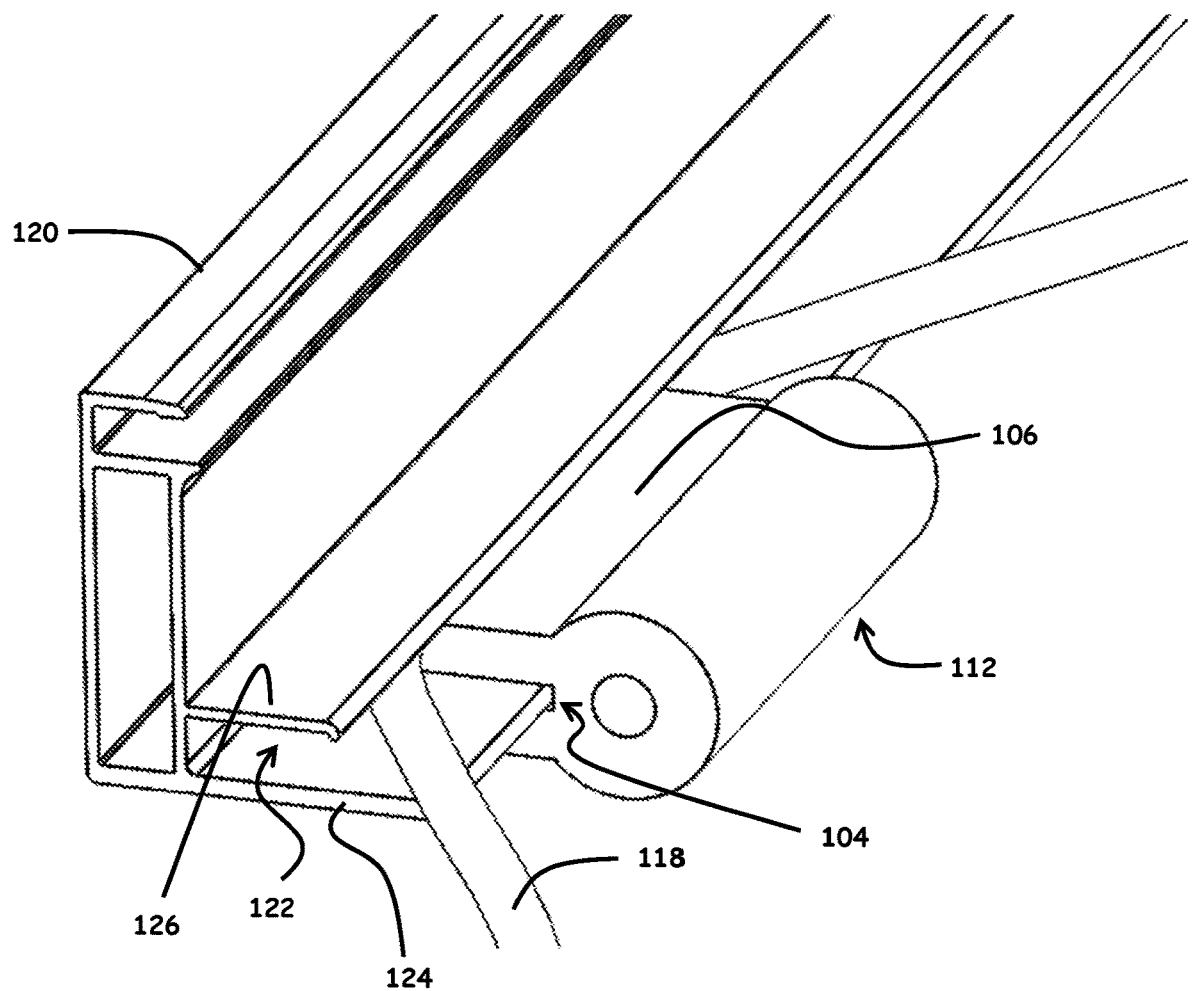

FIG. 2 is a perspective view of an example insertion tool 112 including an insertion flange 106 and an alignment flange 114. The insertion flange 106 and the alignment flange extend from an outer surface of a grip 102 of the insertion tool 112. The alignment flange 114 and the insertion flange 106 define a gap sized to receive a flange 124 or a cable management flange 126 (shown in FIG. 3) when the insertion tool 112 is used to insert the cable 118 into a cable management cavity 122 as shown in FIGS. 3-5.

The alignment flange 114 is sized to extend along the flange 124 or the cable management flange 126 and align the insertion flange 106 within the cable management cavity 122. The alignment flange 114 has a length that is greater than the length of the insertion flange 106.

The insertion tool 112 also includes a stop 104 positioned between the alignment flange 114 and the insertion flange 106 to contact the flange 124 or the cable management flange 126 defining the cable management cavity 122. The stop 104 is a flat surface on the grip 102 and extends across the width of the gap between the attached ends of the insertion flange 106 and the alignment flange 114. The stop 104 is positioned to contact the flange 124 or the cable management flange 126 when the insertion tool 112 inserts the cable to the desired depth in the cable management cavity.

Figure 8:
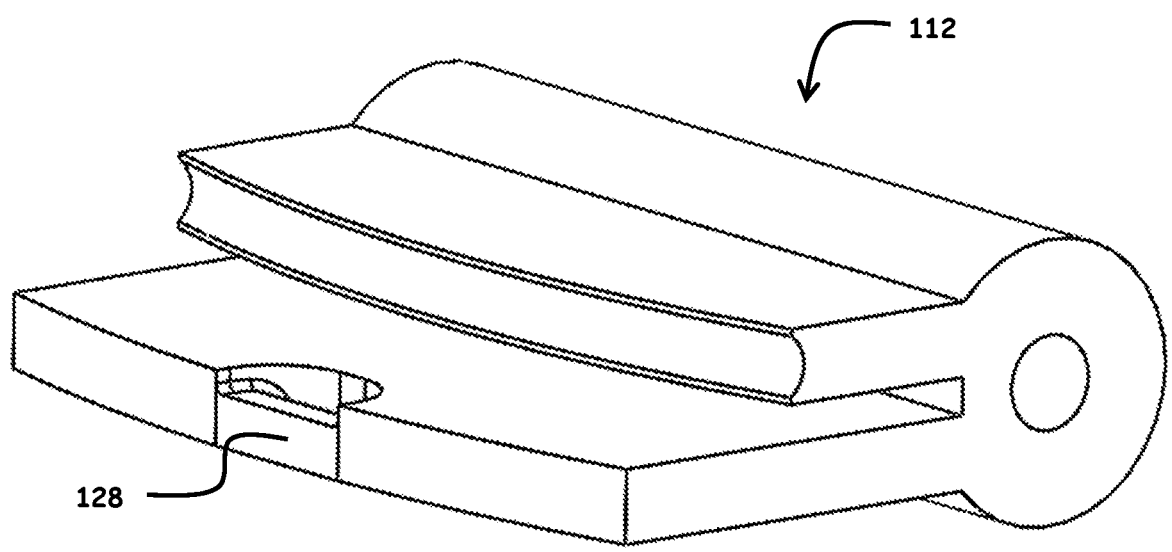
FIG. 8 is a second perspective view of the insertion tool shown in FIG. 2.
Figure 9:
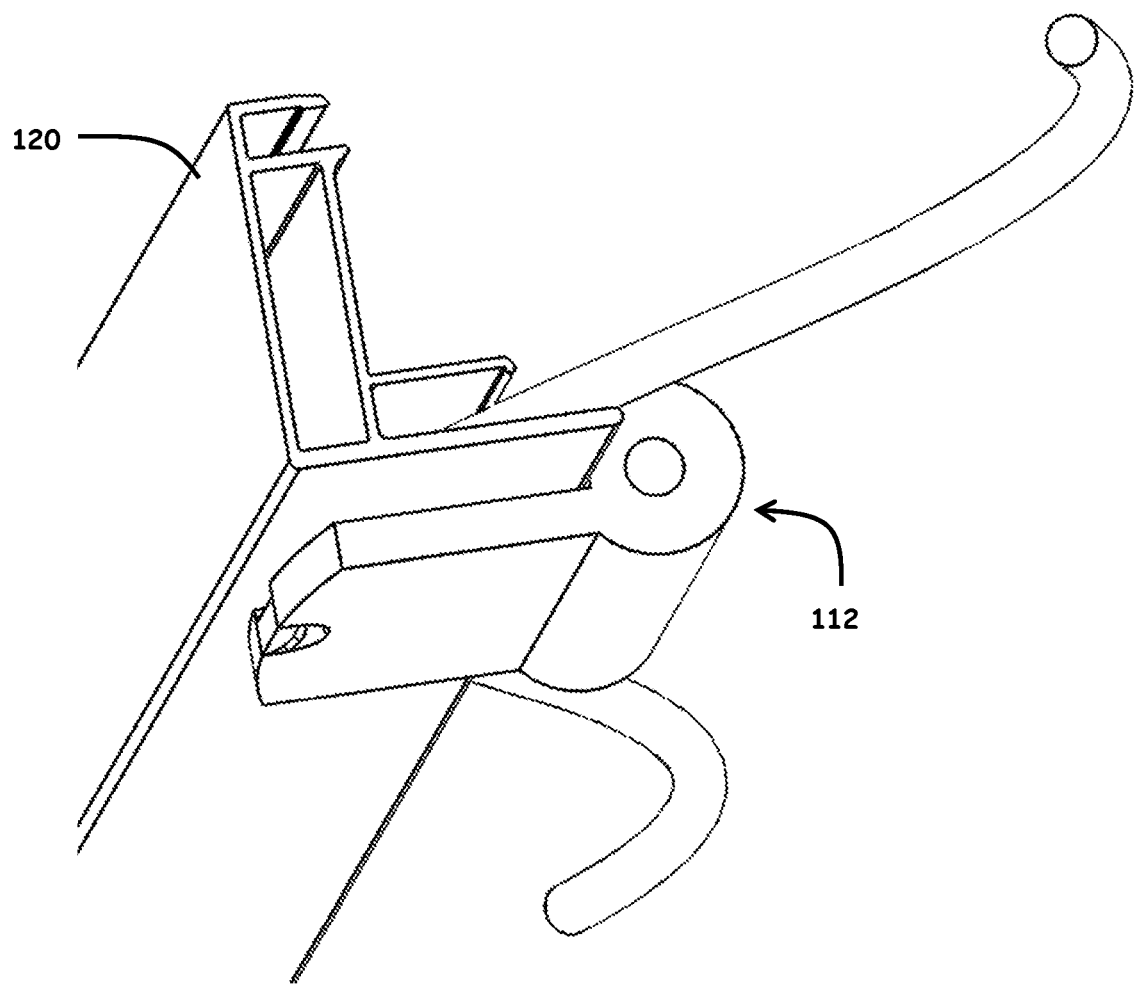
FIG. 9 is a perspective view showing a cable inserted into the cable management cavity using the insertion tool shown in FIG. 2.

In addition, the alignment flange 114 includes an opening 116 at its distal end. Specifically, the distal end of the alignment flange 114 includes a surface defining a notch and a bar extending across the notch to define the opening 116. The opening 116 is sized to receive a rope for attaching the insertion tool 112 to a person or object. Also, the opening 116 may receive an object other than a rope such as a hook or clip for storing the insertion tool 112 when the insertion tool 112 is not in use. The bar 128 (shown in FIG. 8) may have a thickness less than the thickness of the rest of the alignment flange to facilitate a rope, hook, clip, or other object being positioned within the opening 116. Accordingly, in the example, the insertion tool 112 includes at least two attachment features 116, 110 that may be used separately or together for storing the insertion tool 112. In other embodiments, the insertion tool 112 may include one or more openings for receiving a rope or object. In some embodiments, other components of the insertion tool, such as the insertion flange 106, may include an opening for receiving a rope or object. In other embodiments, the insertion tool 112 may include any attachment features 116, 110 that facilitate the insertion tool 112 being stored or transported.

Figure 6:
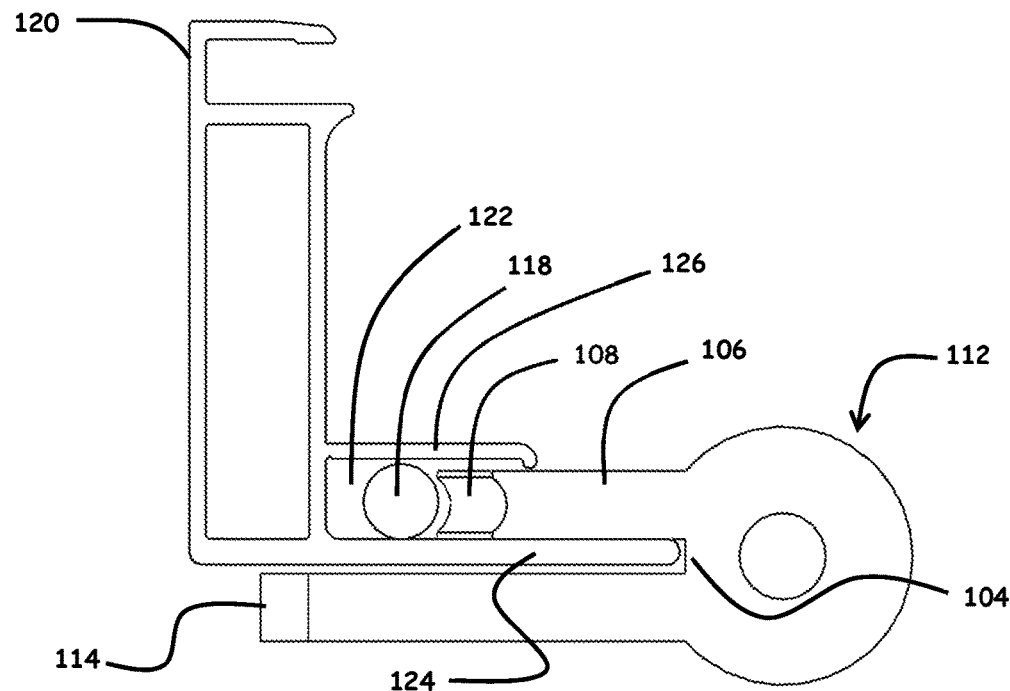
FIG. 6 is a sectional view of the insertion tool being used to insert the cable in the cable management cavity shown in FIGS. 3-5.
Figure 7:
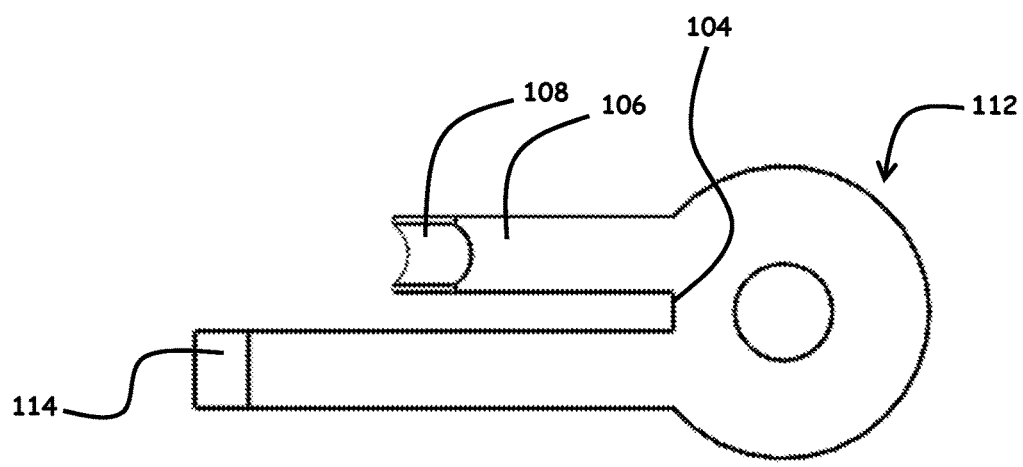
FIG. 7 is a sectional view of the insertion tool shown in FIG. 2.

FIGS. 3-5 are perspective views showing a cable 118 being inserted into a cable management cavity 122 using the insertion tool 112. FIG. 6 is a side view of the insertion tool 112 being used to insert the cable 118 into the cable management cavity 122. The cable 118 may be inserted during assembly or installation of a PV module. For example, the cable 118 may be inserted into the cable management cavity 122 to attach the cable to a PV module frame wall 120 before or after the PV module is mounted to a surface. Moreover, in some embodiments, the cable 118 may be inserted into the cable management cavity 122 at a fabrication location prior to shipping the PV module to an installation site. Also, in some embodiments, the insertion tool 112 may be used to insert the cable 118 into the cable management cavity 122 using an automated process, or at least a partly automated process during the assembly of the PV module.

To attach the cable 118 to a PV module frame wall 120 of a PV module framing system or a PV module racking system using the insertion tool 112, the cable 118 is positioned next to a cable management cavity 122 defined by a flange 124 of the PV module framing system or the PV module racking system. Then, the cable 118 is contacted with the insertion flange 106 of the insertion tool 112. Specifically, the second end of the insertion flange 106 contacts the cable 118. In the example, the second end is curved and includes the recess 108 to receive the cable 118. Accordingly, the second end reduces contact pressure on the cable 118 as the cable is inserted into the cable management cavity 122, prevents damage to the cable 118, enhances the capture and control of the cable 118 during the insertion process, and contacts a sufficient portion of the cable 118 to guide the cable 118 to the desired depth in the cable management cavity 122.

In addition, the second end of the insertion flange 106 has a contact surface that is smooth and free of any sharp edges that could damage the cable 118 or harm the user. Moreover, the insertion tool 112 is shaped such that only the contact surface contacts the cable 118 as the insertion tool is used to insert the cable into the cable management cavity 122.

With the second end of the insertion flange 106 in contact with the cable 118, the user inserts the cable 118 into the cable management cavity 122 to a desired depth using the insertion tool 112. The insertion flange 106 and the cable 118 may be inserted into the cable management cavity 122 until the stop 104 contacts the flange 124. As the insertion flange 106 is inserted into the cable management cavity 122, the flange 124 may be positioned in the gap between the flanges 106, 114 and the alignment flange 114 may slide along the flange 124 to align the insertion flange 106 within the cable management cavity 122.

Figure 10:
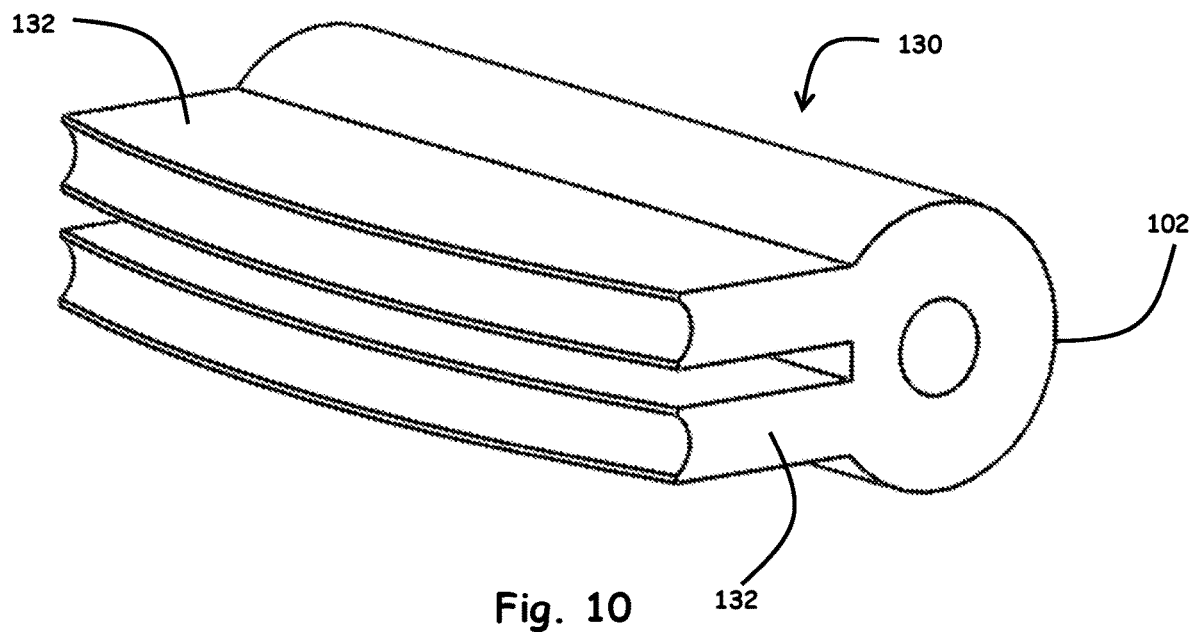
FIG. 10 is a perspective view of an example insertion tool including two flanges having ends shaped to receive cables in recesses.

FIG. 10 is a perspective view of an example insertion tool 130 including two flanges 132 having recessed ends shaped to receive a cable. The flanges are also curved along their extension. In the example, the flanges 132 are identical such that the insertion tool is symmetric about a plane extending through a middle of the gap between the flanges. Accordingly, the insertion tool may be used in multiple orientations. In other embodiments, the flanges 132 may have shapes and/or sizes that are different from each such that the insertion tool is able to be used with different cables and/or cable management cavities.

During use of the insertion tool, one of the flanges 132 may act as an insertion flange to insert a cable into a cavity and the other flange 132 may act as an alignment flange to align the insertion flange within the cavity. In further embodiments, both flanges 132 may act as insertion flanges to insert cables into separate cable management cavities simultaneously.

Figure 11:
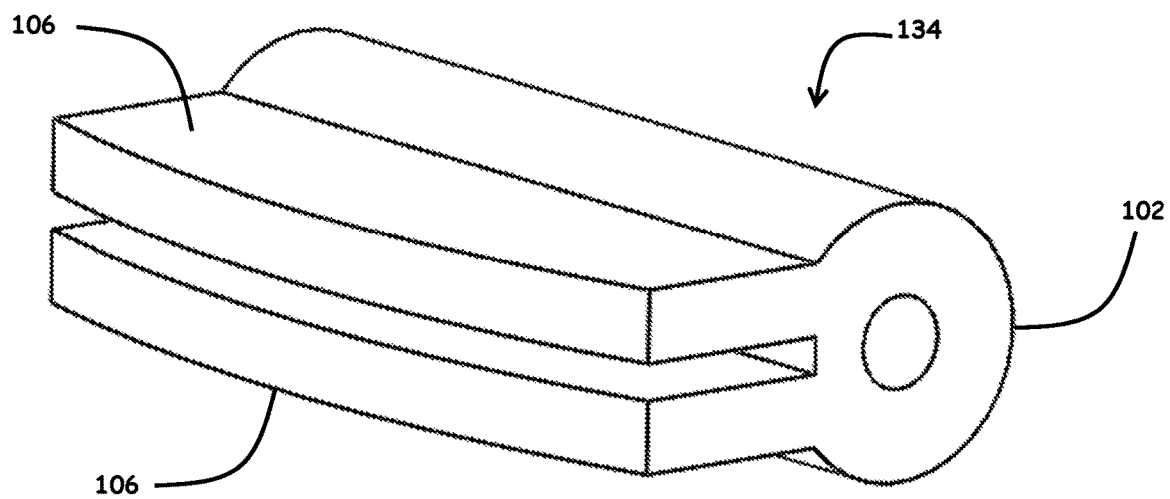
FIG. 11 is a perspective view an example insertion tool including two insertion flanges having curved ends.

FIG. 11 is a perspective view of an example insertion tool 134 including two insertion flanges 106 having curved ends. The curved ends of the flanges allow the insertion tool to contact cables with a desired force along a length of the cables and provide reduced contact pressure between the cables and the insertion tool. The curved ends are substantially smooth and free of any recesses or protrusions. Accordingly, the insertion tool 134 may be simpler to manufacture than other insertion tools.

Figure 12:
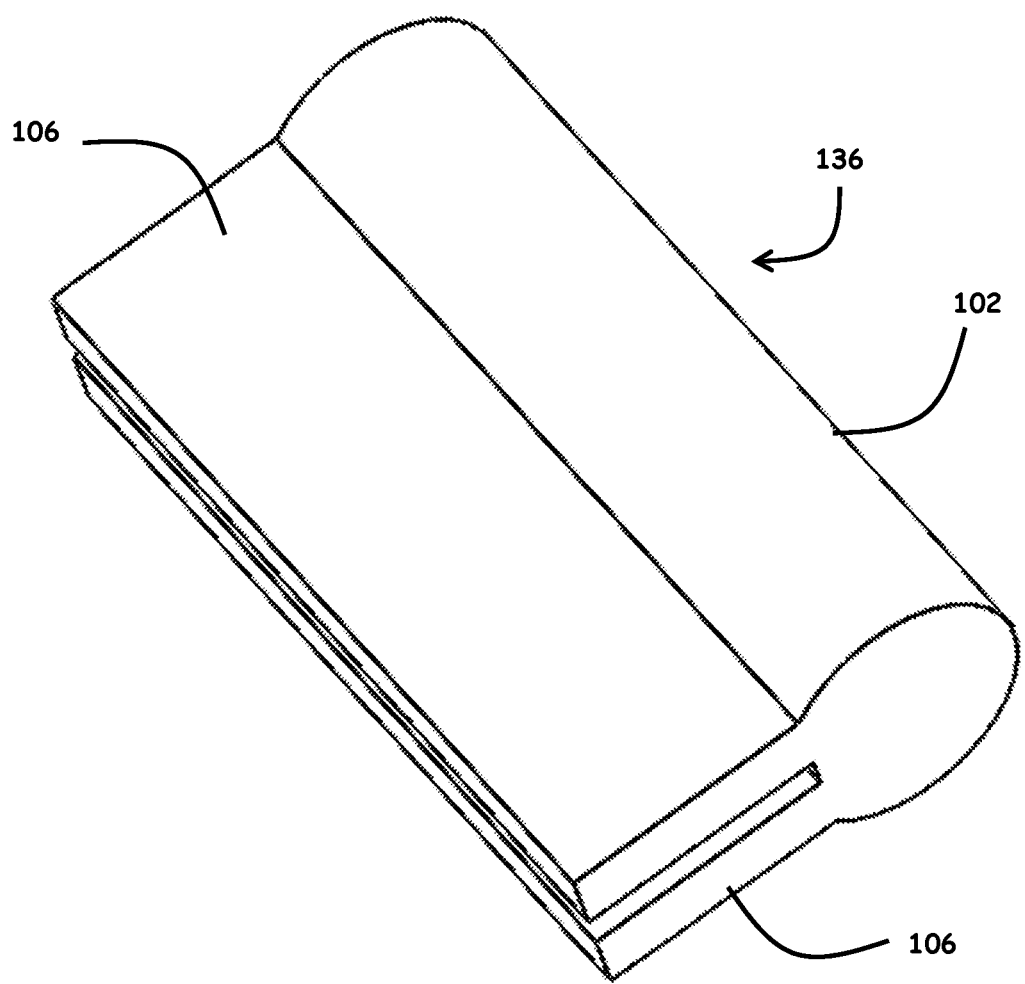
FIG. 12 is a perspective view of an example insertion tool including two insertion flanges having flat ends.

FIG. 12 is a perspective view of an example insertion tool 136 including two insertion flanges having flat ends. The flanges are solid cuboids. In addition, the grip is a solid cylinder. Accordingly, the insertion tool may be more durable and simpler to manufacture than other insertion tools.

Figure 13:
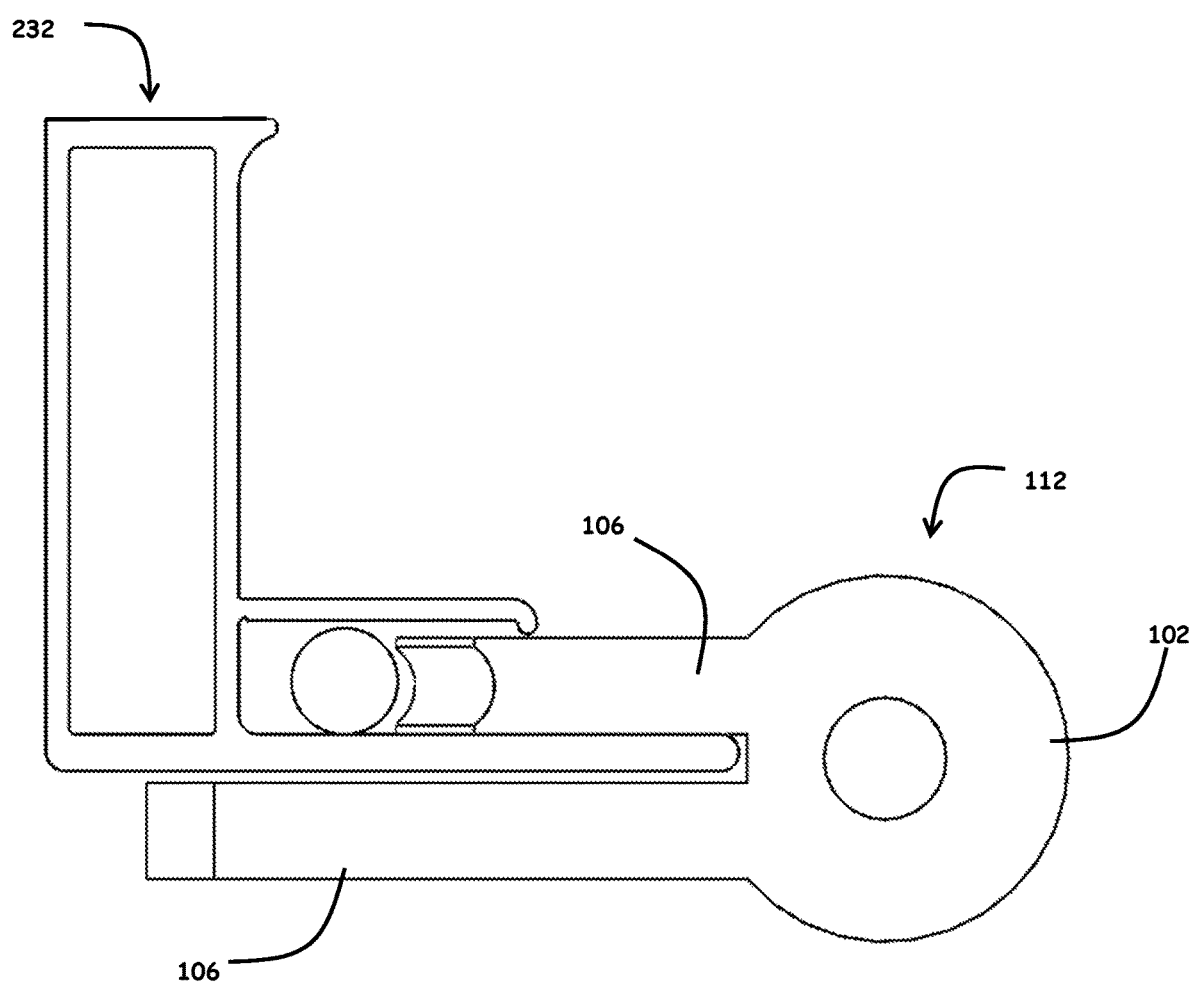
FIG. 13 is a sectional view of the insertion tool shown in FIG. 2 being used to insert a cable into a cable management cavity of a frame member of a PV framing or racking system.

FIG. 13 is a sectional view of the insertion tool 112 being used to insert a cable into a cable management flange of a frame member 232 of a PV framing or racking system. Specifically, in the example, the frame member 232 does not include a laminate flange for attaching a laminate and may be a cross member of the PV framing system or the racking system or a member of a module frame. The frame member 232 includes a wall, a mounting flange extending from a bottom of the wall, and a cable management flange extending from an interior surface of the wall. The mounting flange and the cable management flange define a cable management cavity. The insertion tool is configured to insert the cable into the cable management cavity.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A PV system comprising:
   a PV module framing system or a PV module racking system, wherein a cable management cavity is defined by a flange of a frame member of the PV module framing system or the PV module racking system;
   a cable; and
   an insertion tool for use with the cable management cavity, the insertion tool comprising:
      a grip for a user to grasp the insertion tool, the grip having a longitudinal axis, the grip including two side surfaces and an outer surface, the outer surface extending between the two side surfaces and parallel to the longitudinal axis, wherein the grip is shaped for the user to grasp the outer surface; and
      an insertion flange extending directly from the outer surface of the grip, the insertion flange including a first end attached to the grip and a second end shaped to contact the cable,
   wherein the insertion flange is structurally capable of inserting the cable into the cable management cavity configured to house the cable and retain the cable when the insertion flange is removed from the cable management cavity, the insertion flange is sized to fit within the cable management cavity and insert the cable into the cable management cavity to a desired depth, the insertion flange is structurally capable of being removed from the cable management cavity without the cable when the cable is at the desired depth, the insertion flange having a length defined between the first end and the second end in a direction perpendicular to the longitudinal axis,
   wherein the length is selected to allow the insertion flange to insert the cable into the cable management cavity to the desired depth.

2. The PV system in accordance with claim 1 further comprising an alignment flange extending directly from the outer surface of the grip, wherein the alignment flange and the insertion flange define a gap sized to receive a flange defining the cable management cavity and provide alignment of the insertion flange within the cable management cavity when the insertion tool is used to insert the cable into the cable management cavity, wherein the alignment flange has a length that is greater than or equal to the length of the insertion flange.

3. The PV system in accordance with claim 1 further comprising a stop that contacts a flange defining the cable management cavity and limits the depth that the cable is inserted into the cable management cavity using the insertion tool.

4. The PV system in accordance with claim 1 wherein the second end has a recess shaped to receive the cable.

5. The PV system in accordance with claim 1, wherein the side surfaces of the grip or the insertion flange define an opening sized to receive a rope for attaching the insertion tool to a person or object.

6. The PV system in accordance with claim 1, wherein the grip includes a cylindrical body defining a cavity extending along the longitudinal axis of the grip, the cavity being sized to receive a rope.

7. The PV system in accordance with claim 1, wherein the insertion flange defines an opening sized to receive a rope for attaching the insertion tool to a person or object.

8. The PV system in accordance with claim 1 further comprising an alignment flange defining an opening sized to receive a rope for attaching the insertion tool to a person or object.

9. The PV system in accordance with claim 1, wherein the second end of the insertion flange is curved to reduce a contact force between the insertion flange and the cable when the insertion tool is used to insert the cable into the cable management cavity.

10. The PV system in accordance with claim 1, wherein the second end of the insertion flange has a contact surface that is smooth and free of any sharp edges that could damage the cable or harm the user, wherein the insertion tool is shaped such that only the contact surface contacts the cable as the insertion tool is used to insert the cable into the cable management cavity.

11. An insertion tool for inserting a cable into a cable management cavity defined by a flange of a PV module framing system or a PV module racking system, the insertion tool comprising:
   a grip for a user to grasp the insertion tool;
   an insertion flange extending from the grip, the insertion flange including a first end attached to the grip and a second end shaped to contact a cable, wherein the insertion flange is structurally capable of inserting the cable into the cable management cavity configured to house the cable and retain the cable when the insertion flange is removed from the cable management cavity, the insertion flange is sized to fit within the cable management cavity and insert the cable into the cable management cavity to a desired depth, the insertion flange is structurally capable of being removed from the cable management cavity without the cable when the cable is at the desired depth, the insertion flange having a length from the second end to the first end;

an alignment flange extending from the grip and having a length that is greater than or equal to the length of the insertion flange, wherein the alignment flange and the insertion flange define a gap sized to receive the flange defining the cable management cavity, the alignment flange shaped and sized to extend along the flange of a PV module and provide alignment of the insertion flange within the cable management cavity when the insertion tool is used to insert the cable into the cable management cavity; and a stop sized and shaped to contact the flange defining the cable management cavity and limit the depth that the cable is inserted into the cable management cavity using the insertion tool.

12. The insertion tool in accordance with claim 11 in combination with the PV module framing system or the PV module racking system.

13. The insertion tool in accordance with claim 11, wherein the grip includes a body having a first side, a second side, and an outer surface extending between the first side and the second side, wherein the insertion flange and the alignment flange extend from the outer surface of the body.

14. The insertion tool in accordance with claim 11, wherein the stop extends between the insertion flange and the alignment flange.

15. The insertion tool in accordance with claim 11, wherein the second end of the insertion flange is curved to reduce a contact force between the insertion flange and the cable when the insertion tool is used to insert the cable into the cable management cavity.

16. The insertion tool in accordance with claim 11, wherein the second end of the insertion flange has a contact surface that is smooth and free of any sharp edges that could damage the cable or harm the user, wherein the insertion tool is shaped such that only the contact surface contacts the cable as the insertion tool is used to insert the cable into the cable management cavity.

17. A method of attaching the cable of claim 1 to the PV module framing system of claim 1 or the PV module racking system of claim 1 using the insertion tool of claim 1, the method comprising:

positioning the cable adjacent the cable management cavity defined by the flange of the frame member of the PV module framing system or the PV module racking system;

contacting the cable with the insertion flange of the insertion tool, the insertion tool including the insertion flange and the grip for a user to grasp the insertion tool, the grip having the longitudinal axis, the grip including the two side surfaces and the outer surface, the outer surface extending between the two side surfaces and parallel to the longitudinal axis, wherein the grip is shaped for a user to grasp the outer surface, the insertion flange extending directly from the outer surface of the grip and parallel to the longitudinal axis, the insertion flange including a first end attached to the grip and a second end shaped to contact the cable; and inserting the cable into the cable management cavity to a desired depth using the insertion tool, wherein the insertion flange is structurally capable of inserting the cable into the cable management cavity configured to house the cable and retain the cable when the insertion flange is removed from the cable management cavity, the insertion flange is sized to fit within the cable management cavity, the insertion flange having the length defined between the first end and the second end in the direction perpendicular to the longitudinal axis, wherein the length is selected to allow the insertion flange to insert the cable into the cable management cavity to the desired depth, and wherein the insertion flange is structurally capable of being removed from the cable management cavity without the cable when the cable is at the desired depth.

18. The method in accordance with claim 17 further comprising contacting the flange with a stop of the insertion tool when the cable is at the desired depth.

19. The method in accordance with claim 17 further comprising aligning the insertion flange within the cable management cavity using an alignment flange of the insertion tool, wherein the alignment flange has a length that is greater than or equal to the length of the insertion flange.

* * * * *